United States Patent
Karlsen et al.

(10) Patent No.: US 8,646,099 B2
(45) Date of Patent: Feb. 4, 2014

(54) MIDLET SIGNING AND REVOCATION

(75) Inventors: Johnny Karlsen, Jarfalla (SE); Per Willars, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 248 days.

(21) Appl. No.: 13/124,936

(22) PCT Filed: Oct. 20, 2008

(86) PCT No.: PCT/SE2008/051173
§ 371 (c)(1),
(2), (4) Date: Apr. 19, 2011

(87) PCT Pub. No.: WO2010/047625
PCT Pub. Date: Apr. 29, 2010

(65) Prior Publication Data
US 2011/0191860 A1   Aug. 4, 2011

(51) Int. Cl.
*G06F 21/00* (2013.01)
(52) U.S. Cl.
USPC .......................................................... 726/27
(58) Field of Classification Search
USPC .......................................................... 726/27
See application file for complete search history.

(56) References Cited

U.S. PATENT DOCUMENTS

| | | | |
|---|---|---|---|
| 5,892,904 A * | 4/1999 | Atkinson et al. | 726/22 |
| 6,308,266 B1 * | 10/2001 | Freeman | 713/156 |
| 2005/0039022 A1 * | 2/2005 | Venkatesan et al. | 713/176 |
| 2006/0271396 A1 * | 11/2006 | Lee et al. | 705/1 |

OTHER PUBLICATIONS

Author Unknown. "VeriSign Code Signing for Microsoft Authenticode Technology—Realizing the Possibilities of Internet Software Distribution." VeriSign, Inc., 2005.

\* cited by examiner

*Primary Examiner* — Kambiz Zand
*Assistant Examiner* — Aubrey Wyszynski
(74) *Attorney, Agent, or Firm* — Coats and Bennett PLLC

(57) ABSTRACT

The present invention is related to a method of securing integrity and authenticating origin and privileges of a piece of code. According to the invention, a method of securing integrity and authenticating origin and privileges of a piece of code in a communication network by digitally signing said piece of code, is characterized by the steps of: providing an aggregator (C), which is a holder of a valid signing certificate, —submitting a developer material to the aggregator, inserting a revocation code into the developer material, building a complete piece of code using the developer material and the revocation code, digitally signing the complete piece of code using the certificate held by the aggregator, making the digitally signed complete piece of code retrievable to the holder (B) of the developer material, providing a server (C2) for authenticating privileges of the digitally signed complete piece of code, —executing the revocation code and checking with the server whether the privileges of the digitally signed complete piece of code have not been revoked.

20 Claims, 1 Drawing Sheet

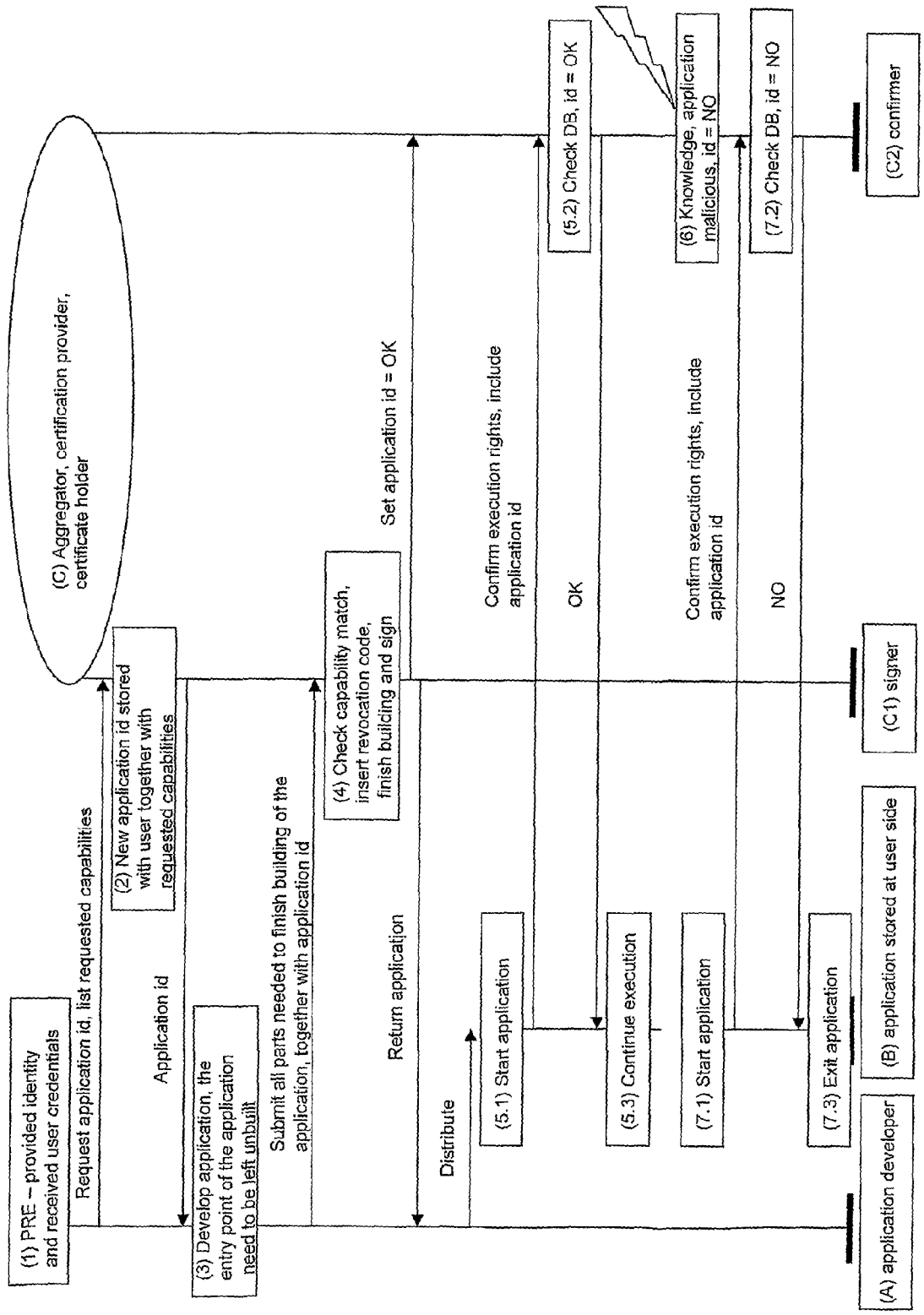

MIDLET SIGNING AND REVOCATION

FIELD OF THE INVENTION

The present invention relates generally to a method of controlling a piece of code in a communication network and, more specifically, to the method of securing integrity and authenticating origin and privileges of a piece of code in a communication network by digitally signing said piece of code.

BACKGROUND OF THE INVENTION

It is commonly practised to digitally sign program installation files with a valid signing certificate in order to secure that these files (and consequently—the programme) contain genuine code, which has not been altered in any way, and that the contents of these files can be tracked back to the party responsible for it. In case of files containing small applications (for example Java MIDlets run on mobile phones etc.) the digital signature is also used to grant the programme extended execution rights (such as access to sensitive capabilities of the device, like sending SMS or reading the user's address book). Certificates for digitally signing files are available commercially from specialized vendors, whose responsibility is to ensure, that parties receiving certificates from them can be authenticated and traced. One of the methods used for this purpose by vendors is to offer certificates only to registered companies and not to private parties.

Such method presents a considerable organizational and financial obstacle in using digital signatures by a long tail of software developers, dorm-room innovators, garage startups etc., who would like to be able to start developing, testing and spreading their digitally signed applications without having to start a company and investing time and money into procedures they are really not interested in.

Moreover, in view of rapidly expanding exploitation of small programs (e.g. MIDlets) on personal mobile terminals, such as mobile phones, there is a practical need of controlling the privileges given initially to such programmes in time, in case if for example their code would prove to be malicious in any way.

SUMMARY OF THE INVENTION

It is thus the object of the present invention to provide a method of securing integrity and authenticating origin of a piece of code in a communication network by digitally signing said piece of code, in which method the signing certificate is easily available at relatively low cost to all interested parties, including individual developers. It is a further object of the present invention to provide a method of controlling in time privileges granted initially to a digitally signed piece of code in a communication network.

A method of securing integrity and authenticating origin and privileges of a piece of code in a communication network by digitally signing said piece of code, according to the invention is characterized by the steps of:
  providing an aggregator, which is a holder of a valid signing certificate,
  submitting a developer material to the aggregator,
  inserting a revocation code into the developer material,
  building a complete piece of code using the developer material and the revocation code,
  digitally signing the complete piece of code using the certificate held by the aggregator,
  making the digitally signed complete piece of code retrievable to the holder of the developer material
  providing a server for authenticating privileges of the digitally signed complete piece of code,
  executing the revocation code and
  checking with the server whether the privileges of the digitally signed complete piece of code have not been revoked.

The inventive method preferably further comprises the steps of:
  identifying the party, who submits the developer material into the aggregator and
  giving to this party confidential credentials to be used in the signing process.

According to one or more embodiments, the identification of the party preferably includes any of the following means:
  appearing in person with a valid identification document,
  surrendering his credit card details,
  depositing a certain amount of money.

In the preferred variant the inventive method comprises the step of:
  declaring privileges sought for the piece of code by its developer before submission of the developer material to the aggregator.

In such case, it is particularly preferred that the inventive method further comprises the step of:
  examining the developer material by the aggregator to see if the privileges requested by the developer material conform with the privileges declared.

According to one or more embodiments, the developer material may include any of the following: raw code, linkable library, application descriptor, software class, application identity. Preferably, the developer material includes *.jar file or *.jad file.

According to the inventive method the developer material may preferably be obfuscated.

The developer material is preferably submitted to the aggregator through a website.

If the developer material is submitted to the aggregator through a website and confidential credentials have been given to the party who submits the developer material, the developer material is preferably submitted using the given credentials.

According to the inventive method, the revocation code is preferably executed each time the digitally signed complete piece of code is started.

In a preferred embodiment of the inventive method, the operation of the digitally signed complete piece of code is terminated if privileges have been revoked.

In a further preferred variant of the method, the information of revoking privileges is stored by the digitally signed complete piece of code. In this case, it is preferred that the digitally signed complete piece of code—once executed—only shows information to the user about revoked privileges.

In another preferred embodiment of the inventive method the operation of the digitally signed complete piece of code is terminated if revocation of privileges cannot be explicitly denied by the server.

Preferably, according to the inventive method, each digitally signed complete piece of code has its unique entry point to the server, to be used to check if the privileges have not been revoked. In this case it is preferred that the digitally signed complete piece of code contacts the server using the https protocol.

In a particularly preferred embodiment of the inventive method, the digitally signed complete piece of code is a MIDlet.

The advantage of the present inventive method is that small third party developers are provided with an easy way to safely develop application, which include sensitive capabilities. This is not possible today, when it is required to establish a registered company in order to be able to digitally sign applications (in particular: Java MIDlets). A further advantage of the present inventive method is that it enables revoking execution privileges for individual applications, independently of revoking the certificates. This is contrary to the nowadays existing structure, in which once a certificate is revoked (e.g. in order to inhibit spreading of malicious applications)—all applications signed with this certificate are automatically revoked.

BRIEF DESCRIPTION OF DRAWING

The attached drawing presents a flowchart corresponding to a preferred embodiment of the inventive method.

DETAILED DESCRIPTION OF THE INVENTION

The invention will be now explained with reference to the attached drawing.

One or more embodiments herein introduce an aggregator, which is a holder of a valid signing certificate. This certificate can be bought from a specialized vendor by the registered company, who provides/operates the aggregator. The aggregator will then assume the responsibility for signing pieces of code for different entrepreneurs, like for example individual startup developers.

The attached FIGURE presents a flowchart of actions performed according to a preferred embodiment of the inventive method between three parties: the application developer A, the application stored at user's side B and the aggregator C. Please note that in the presented case the aggregator C plays a dual role, namely of application's signer C1 (as it is the holder of signing certificate) and of confirmer C2 of application's execution rights.

Previously to actions illustrated in the FIGURE, the developer A registers himself with the aggregator C, providing appropriate means of personal identification. He appears in person at the company who operates the aggregator, presents a valid ID card and deposits a certain amount of money using his credit card. It is obvious that depending on the situation the identification can be more or less strong and different means of identifying the developers can be applied. After successfully completing the identification step the developer A becomes a user of the aggregator's services and is given secret credentials, to be used in the process of signing of pieces of code that he is going to develop. This step corresponds to the box marked 1 in the FIGURE.

Referring to the FIGURE, after the pre-performed identification step discussed above, the procedure begins when the application developer A contacts the aggregator C (e.g. via web interface), requesting application id and including a list of privileges that he is seeking for his application, like for example reading user's address book, or sending messages. For this purpose the application developer A uses the previously obtained secret credentials. Upon receiving the request by the aggregator C, acting as the application's signer C1, a new application id together with the requested capabilities is stored on the aggregator's side (box 2 in the FIGURE). This information is of course associated with the application developer A. The application id is then returned to the application developer A.

Depending on the situation, the application to be signed may have to conform to certain policies described by the aggregator and confirmed by the developer. For example, these may be sort of soft behavioral rules, which applications should behave within to be accepted by the aggregator. Said policies may also regard the privileges and/or capabilities requested for the application. For example, some of such privileges and/or capabilities may be subject to restrictions.

The application developer A then develops and tests his application, a Java MIDlet in the presented embodiment, to the extent possible without having his application digitally signed. It implies that the entry point of the application needs to be left unbuilt (box 3 in the FIGURE). When the developer A can no longer proceed with his work without having the application signed, he submits his application to the aggregator C, according to the following outline:

a) All the application, except the main MIDlet class, is built as a linkable library *.jar file. This *.jar file can be completely obfuscated, below the level of the methods needed to be called from the main MIDlet class, in order to avoid the aggregator C getting inside knowledge into the developer's A proprietary code.

b) The main MIDlet class, the application descriptor *.jad file, the *.jar file and the application id are submitted through a website to the aggregator C, using the pre-received secret credentials.

c) Appropriate, preferably automated, aggregator's process examines the *.jad file to check whether the privileges actually used by the submitted MIDlet correspond to those submitted in step 2 (a list of which has been stored on the aggregator's C side). After positive verification, a startup call to the aggregator's C revocation code is inserted in the main MIDlet class. This call includes the application id. The MIDlet is then built and digitally signed, together with the aggregator's C *.jar file for the revocation code, using the signing certificate held by the aggregator C. This step corresponds to box 4 in the FIGURE.

d) The aggregator C, acting as signer C1, sets the execution rights flag for the application with given id to "OK" and sends appropriate information to the confirmer C2. This flag is stored in the confirmer's C2 database. Subsequently, the aggregator C enables the complete digitally signed MIDlet to be retrieved by the developer A. The developer A can retrieve his MIDlet, for example from the aggregator's C website, and start using and/or distributing it.

Embodiments herein thus enable the aggregator C to revoke the privileges granted to the application while signing it, if it is reported or discovered by other means that the application is not behaving according to the policies described by the aggregator C and confirmed by the developer A (for example, if—for any reason—the privileges actually executed by the application extend beyond the privileges declared and verified during the signing process). For this purpose, a small piece of code (the revocation code mentioned above) and application id is included in each application signed by the aggregator C. The code will at certain occasions contact the confirmer C2 (which may be a server belonging to the aggregator C) to confirm that the privileges have not been revoked. Depending on the situation different contact schemes and strategies can be devised and applied by the aggregator C. In case the privileges of the application have been revoked, the application is shut down. Moreover, the information about revoked privileges may be stored, e.g. together with the application at user's side B, so that the next time the application is started it will only show a screen with appropriate information to the user. It is very important that there is no possibility for anyone to tamper with the revocation code inserted by the aggregator C, because the whole application is digitally signed.

Hereafter, the actions connected to controlling the privileges given to the application in time will be described. This aim is achieved by the inventive use of the revocation code, mentioned above.

Embodiments herein ensure that signed MIDlet contacts the aggregator C, acting as the confirmer C2, from time to time to check whether the MIDlet is still authorized to execute its privileges. The contact point for the confirmer C2 is built into the revocation code. The security of the system results from the fact that the MIDlet cannot be altered in any way by anyone after it has been digitally signed by the aggregator C (acting as the signer C1). This is ensured by the Java signing process.

Thus, after distribution, a copy of the MIDlet is stored at the user's side B. Once started (box 5.1 in the FIGURE), the revocation code included in the MIDlet makes an https GET request according to the built-in contact point and the application identity to the confirmer C2 (e.g. https://javaaggregator.com/appidentity_35af87e8120ce3bb76d2eb9676aef). The confirmer C2, upon receiving such request, checks in its database whether the execution rights flag for the given application id is "OK", i.e. whether the privileges have not been revoked (box 5.2 in the FIGURE). IF the flag is "OK", the confirmer responds with "200 OK" and the revocation code allows the MIDlet to continue operation (box 5.3 in the FIGURE).

The https request ensures that no one but the confirmer C2 can give confirmation, because no one but the owner of the javaaggregator.com SSL certificate can be contacted.

It should be noted here that anyone can retrieve the application id and also the specific revocation code from the MIDlet, but this information is of no value to anyone else since the MIDlet is not given its privileges based on this code. To the contrary, it is done by the aggregator C signing the MIDlet and the code and application id can only be used to revoke privileges.

However, at some moment, the application is acknowledged to be malicious. Upon receiving such information, the aggregator C, acting as the confirmer C2, changes the execution rights flag for the given application to "NO" (box 6 in the FIGURE).

When the MIDlet is executed for the second time after that moment (box 7.1 in the FIGURE) and contacts the confirmer C2 in the same manner as described in the 5.1 step, the confirmer C2, after check in appropriate database (box 7.2 in the FIGURE) responds with "NO" message. This, in turns, results in terminating the execution and exiting the MIDlet (box 7.3 in the FIGURE).

Many different schemes for how often the confirmer C2 should be contacted by the application stored at user's side B, what information should be given to the user in case of failure etc. can be devised. The basic—strict—policy here is that the confirmer C2 is contacted each time the MIDlet B is started. If the MIDlet B cannot contact the confirmer C2 due to networking issues, the MIDlet B is closed down with appropriate information to the user. If the MIDlet B fails to get an explicit denial of revocation of execution rights from the confirmer C2, the MIDlet B is also closed down with appropriate information to the user.

The above-described embodiment of the inventive method is discussed for illustrative purpose only. Numerous variant and modifications of the method, all falling within the scope of the present invention, will be obvious to those skilled in art.

The invention claimed is:

1. A method implemented by an aggregator for securing the integrity of, and authenticating the origin and privileges of, a piece of code, wherein the aggregator is the holder of a valid signing certificate and is configured to digitally sign different pieces of code with that valid signing certificate for different code developers, wherein the method comprises:
receiving a piece of code from a code developer,
inserting revocation code into the received piece of code, wherein the revocation code is only valid for the received piece of code,
building a complete piece of code using the received piece of code and the revocation code,
digitally signing the complete piece of code using the valid signing certificate held by the aggregator,
making the digitally signed complete piece of code retrievable to the code developer, and
responsive to receiving a request from a remote device executing the revocation code contained in the digitally signed complete piece of code, checking whether or not privileges previously granted to the digitally signed complete piece of code have since been revoked.

2. The method according to claim 1, further comprising identifying the code developer from which the piece of code is received and giving the code developer confidential credentials.

3. The method according to claim 2, wherein said identifying comprises one or more of:
receiving a valid identification document from the code developer,
receiving credit card details from the code developer,
receiving payment of a certain amount of money from the code developer.

4. The method according to claim 2, wherein receiving the piece of code from the code developer comprises receiving the piece of code in conjunction with the confidential credentials given to the code developer.

5. The method according to claim 1, further comprising, before receiving the piece of code from the code developer, receiving a request that the aggregator grant certain privileges to the piece of code.

6. The method according to claim 5, further comprising examining the received piece of code to verify that the privileges actually invoked by the piece of code conform with the certain privileges requested for that piece of code, and, if so, granting those privileges to the piece of code.

7. The method according to claim 1, wherein the received piece of code includes any of raw code, a linkable library, an application descriptor, or a software class.

8. The method according to claim 1, wherein the received piece of code includes a *.jar file or *.jad file.

9. The method according to claim 1, wherein the received piece of code is obfuscated.

10. The method according to claim 1, wherein receiving the piece of code from the code developer comprises receiving the piece of code through a website.

11. The method according to claim 1, wherein inserting the revocation code further comprises inserting a call to the revocation code that will be invoked each time the digitally signed complete piece of code is started.

12. The method according to claim 1, wherein inserting revocation code comprises inserting revocation code that terminates operation of the digitally signed complete piece of code if the aggregator's check reveals that the privileges previously granted to that piece of code have been revoked.

13. The method according to claim 12, wherein inserting revocation code comprises inserting revocation code that stores information at the remote device indicating that the privileges have been revoked.

14. The method according to claim 13, wherein inserting revocation code comprises inserting revocation code that, as part of terminating operation of the digitally signed complete piece of code, shows information to the user of the remote device indicating that the privileges have been revoked.

15. The method according to claim 1, wherein inserting revocation code comprises inserting revocation code that terminates operation of the digitally signed complete piece of code if the aggregator's check does not explicitly deny that the privileges previously granted to the digitally complete piece of code have been revoked.

16. The method according to claim 1, wherein inserting revocation code comprises inserting revocation code that sends said request to an entry point of the aggregator that is unique to the digitally signed piece of code.

17. The method according to claim 16, wherein inserting revocation code comprises inserting revocation code that sends said request to the aggregator using the https protocol.

18. The method according to claim 1, wherein the digitally signed complete piece of code is a MIDlet.

19. A method implemented by an aggregator for tentatively authenticating an application for an application developer, the method comprising:

receiving from an application developer an application and a request that the aggregator grant the application certain privileges;

granting the application the requested privileges responsive to verifying that the privileges actually invoked by the application conform to the requested privileges;

setting an indicator at the aggregator indicating that the application has been granted the requested privileges;

inserting code into the application that will send a request to the aggregator upon execution of the application by a remote device, the request requesting that the aggregator update the remote device regarding whether or not the indicator at the aggregator indicates that the privileges previously granted to the application have since been revoked; and digitally signing the application to indicate that the application includes the inserted code.

20. The method of claim 19, further comprising:

receiving information indicating that the application has invoked privileges that no longer conform to the requested privileges; and updating the indicator to indicate that the privileges previously granted to the application have been revoked.

* * * * *